(12) United States Patent
Ito et al.

(10) Patent No.: US 6,252,360 B1
(45) Date of Patent: Jun. 26, 2001

(54) HIGH VOLTAGE GENERATOR

(75) Inventors: Sadahide Ito, Fukuoka; Takafumi Nagasue, Kumamoto, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/390,797

(22) Filed: Sep. 7, 1999

(30) Foreign Application Priority Data

Sep. 4, 1998 (JP) .................................................. 10-250745
Jun. 11, 1999 (JP) .................................................. 11-164916

(51) Int. Cl.[7] ...................................................... H01J 29/70
(52) U.S. Cl. ............................................. 315/411; 363/21
(58) Field of Search .................................. 315/411, 276, 315/278, 391, 399; 363/20, 21

(56) References Cited

U.S. PATENT DOCUMENTS

| 4,933,830 | * | 6/1990 | Sato et al. | 363/20 |
| 5,189,599 | * | 2/1993 | Messman | 363/21 |
| 5,796,218 | * | 8/1998 | Kwon et al. | 315/411 |
| 6,005,435 | * | 12/1999 | Saida et al. | 327/538 |
| 6,134,123 | * | 10/2000 | Yamada | 363/21 |

FOREIGN PATENT DOCUMENTS 11-103574   4/1999   (JP) .
11-122502   4/1999   (JP) .

* cited by examiner

*Primary Examiner*—Don Wong
*Assistant Examiner*—Thuy Vinh Tran
(74) *Attorney, Agent, or Firm*—Ratner & Prestia

(57) ABSTRACT

The constitution comprises a circuit for feeding the blanking pulse winding voltage floating from a deflecting transformer 8 or a deflecting yoke 5 of a deflecting circuit 15 into a converter circuit composed of inductor 21, capacitor, diode, and resistance, and obtaining a comparative wave suited to a horizontal operation frequency, and means for changing the DC bias voltage value of comparative wave, controlling the drive pulse width of switching element 27, and controlling the high voltage output depending on changes of current flowing time width at the primary side of a high voltage generating transformer. It further comprises a power source winding 29 for controlling the oscillating voltage generated in switching OFF period of the high voltage generating transformer, or a regenerative winding 37 to power source, or both windings, and also means for adding a capacitor for preventing oscillation.

12 Claims, 12 Drawing Sheets

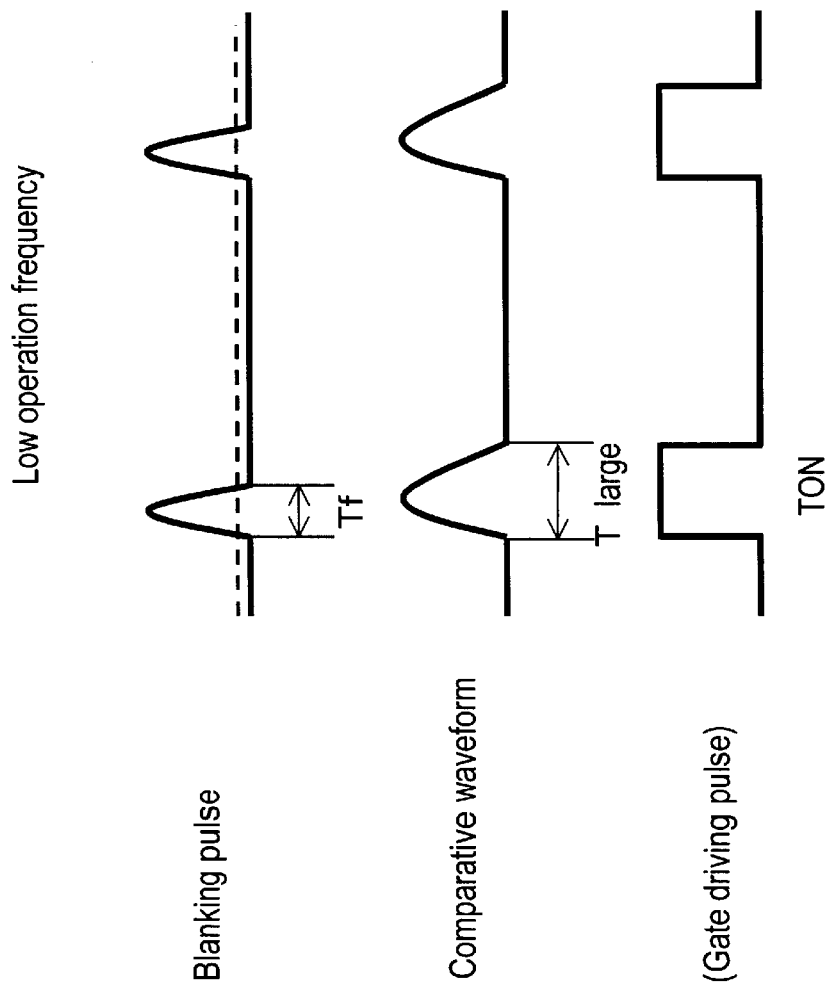

HIGH VOLTAGE GENERATOR

FIELD OF THE INVENTION

The present invention relates to a high voltage generator for CRT such as CRT monitor for computer and TV receiver of high resolution. The invention also relates to stabilization of output voltage of such high voltage generator.

BACKGROUND OF THE INVENTION

In the recent trend of higher picture quality and higher density of personal computer, Hi-Vision TV receiver, digital TV receiver and others, the deflecting frequency is widely used, and the frequency tends to be higher.

In these display devices using CRT, in particular, various proposals have been made relating to:

horizontal deflection, high voltage generating circuit, and control.

The basic operation of the deflecting circuit and high voltage generating circuit in the CRT display device is described below.

FIG. 10 is an explanatory diagram of conventional deflecting circuit and high voltage generating function.

As shown in FIG. 10, a horizontal deflecting circuit (not shown)

feeds a horizontal synchronizing pulse to a deflection control circuit 14, and drives a horizontal deflecting transistor 2.

The deflecting circuit is composed of a deflecting yoke 5, a damper diode 3, and a capacitor 4. The power source is supplied to the deflecting circuit through a deflecting transformer 8.

The horizontal deflecting circuit is used to deflect an electron beam in the horizontal direction.

During scanning period, the horizontal deflecting circuit realizes horizontal deflection by passing a sawtooth type current into the deflecting yoke 5, and returning from end point to start point of scanning during the blanking period.

The resonance pulse occurring in the blanking period is called a blanking pulse. A deflecting and high voltage integrated circuit for obtaining a high voltage output by adding a high voltage winding 61 to the deflecting transformer 8 is used in a general TV receiver.

However, the high voltage output is lowered by increase of electron beam current.

Accordingly, by generation of high voltage fluctuation, both amplitudes of horizontal deflection and vertical deflection fluctuate.

Further, this high voltage fluctuation causes image deformation.

As their solving means, the following two methods are known.

1) Deflecting and high voltage separated circuit system: The deflecting circuit and high voltage circuit are separately composed, and each circuit is controlled independently.

2) Deflecting and high voltage integrated circuit system. The high voltage is stabilized by minimizing effects of high voltage to the deflecting circuit.

Both systems require stabilization of high voltage, simple constitution, efficient operation, and operation at low oscillating voltage.

FIG. 11, FIG. 12 and FIG. 13 show the prior art in the deflecting and high voltage separated circuit. FIG. 11 and FIG. 12 are explanatory diagrams of conventional high voltage generating circuit. FIG. 13 shows an example of operating voltage and current waveform of the conventional high voltage generating circuit.

In FIG. 11, one end of a primary winding 32 of a high voltage generating transformer 69 is connected to the drain of a switching element 27.

Other end of the primary winding 32 is connected to a step-down converter composed of a switching element 10, a flywheel diode 11, a smoothing capacitor 13, and an inductor 12.

By a signal from a deflecting control circuit 14, a synchronizing triangular wave generating circuit 63 is synchronized at f [Hz], and issues a triangular wave for comparison. The secondary side output voltage of the high voltage generating transformer 69 is divided by detecting resistances 45, 46. The divided voltages are fed into an error amplifier 35, and compared with a reference voltage 34. The output amplified by the error amplifier 35 is fed into a pulse width modulation (PWM) comparator 64 together with the triangular wave for comparison. The output of the PWM comparator 64 is connected to the gate of a switching element 10 through a drive circuit 65.

At the gate of the switching element 27, a specific drive pulse is supplied from the deflecting control circuit 14. At the primary side of the high voltage transformer 69, a damping circuit 66 composed of inductor, capacitor and resistance is connected in series to the primary winding 32. This damping circuit 66 is for suppressing the oscillating current due to resonance of the leakage inductance and distributed capacity.

The high voltage generating circuit of such circuit constitution is a step up/down DC/DC converter operating by two switching elements.

In this case, the switching element 10 is switched by the PWM signal synchronized at f [Hz], and the feedback system is composed so that the high voltage output may be uniform.

In this constitution, the object of stabilization of high voltage output is achieved.

However, the constitution in FIG. 11 requires two switching elements, synchronizing triangular wave oscillating circuit 63, and PWM comparator 64 and the circuit is complicated.

The constitution in FIG. 11 is also accompanied by switching loss due to two switching elements, and loss of damping circuit 66 and the efficiency is lowered.

The PWM operation by triangular wave can control in a wide range. However, it is complicated because it requires setting of maximum ON time and others.

An example of circuit using one switching element is shown in FIG. 12.

In FIG. 12, one end of the primary winding 32 of the high voltage generating transformer 69 is connected to the drain of the switching element 27. The deflecting circuit 62 issues a synchronizing signal of automatic frequency control (AFC) or the like to the synchronizing triangular wave oscillating circuit 63. The oscillating circuit 63 issues a triangular wave for comparison. The detection of high voltage and error amplifier circuit are same as in FIG. 11. Similarly, the output of the PWM comparator 64 drives the gate of the switching element 27 through the drive circuit 65. The control operation for stabilization of high voltage is same as in FIG. 11. However, the high voltage generating mode by switching is a discontinuous mode operation by a step-up converter.

The circuit in FIG. 12 is simple, using only one switching element. However, when the switch 27 is turned off, the circuit in FIG. 12 generates a flyback pulse. The high voltage winding supplies a high voltage in this OFF period (Toff). At this time, owing to the inductance of the primary winding 32, distributed capacity of high voltage winding, and capacity of the switching element 27, a violent oscillating voltage is generated as shown in FIG. 13. As a result, when the switch 27 is turned on, a high peak current flows instantly if the drain voltage is at the peak of the oscillating voltage.

This phenomenon causes image noise or adverse effects on control operation (oscillation, malfunction). The circuit in FIG. 12 has such defects.

Also in the circuit in FIG. 12, the stress to the switching element 27 is large, the loss increases, the oscillating current when turning on the switch is large, and image noise or malfunction may be caused.

To prevent these defects, the damping circuit 66 is connected to the primary circuit. However, its loss is as much as several watts.

Therefore, when the damping circuit 66 is connected to the primary circuit, the efficiency is lowered, large parts must be used, and it is less economical, additional circuits are required, such as synchronizing triangular wave oscillating circuit 63 and PWM comparator 64, and setting of maximum ON time is complicated. They are same as explained in FIG. 11.

FIG. 14 shows a prior art of a deflecting and high voltage integrated circuit. This is an explanatory diagram of a conventional deflecting high voltage generating circuit. In the case of this circuit, a first high voltage generating transformer 60 is installed at one leg of a U-shaped core 53. In order to minimize the effects of high voltage fluctuations on the deflecting operation, it is operated to regenerate energy at power source +B from the primary winding 67 through a diode 68. A second high voltage corrective transformer 69 is cascade-connected to the low voltage side (grounding side) of this high voltage winding. A deflecting transformer winding 8 is placed at other leg of the U-shaped core 53. The deflecting circuit operates same as the circuit shown in FIG. 10. However, using the blanking pulse, the high voltage generating transformer 60 generates part of the high voltage. The circuit shown in FIG. 14 achieves the object by controlling the output voltage of the corrective transformer 69 in order to keep constant the high voltage output.

The operation of the high voltage stabilization by using the corrective transformer is explained below. A switching winding 9 is wound at the deflecting winding side. The blanking pulse of positive polarity (one end) of the switching winding 9 is connected to the gate of the switching element 27. The negative polarity side (other end) of the switching winding 9 is connected to the output of an inversion error amplifier 51 which operates on a negative power source. One end of the primary winding 32 of the corrective transformer 69 is connected to the power source +B', and other end of the primary winding 32 is connected to the drain of the switching element 27. The source of the switching element 27 is grounded. A rectifying circuit is connected to the output of the high voltage winding 39 of the secondary side, and the output voltage is applied to the low voltage side (grounding side) of the first high voltage generating transformer 60. As a result, the final high voltage output is the sum of the outputs of the two transformers. When the output voltage declines, the detection voltages divided by the detecting resistances 45, 46 are also lowered. Accordingly, the output of the inversion error amplifier 51 climbs up and becomes nearly zero volt. Consequently, the DC bias voltage of the winding 9 rises, and the voltage applied to the gate is raised. When the gate exceeds the threshold voltage, the switching element 27 is turned on. When the gate becomes lower than the threshold voltage, the switching element 27 is turned off. By this operation, the time (the ON time) surpassing the threshold voltage of the blanking pulse elevated in the DC bias voltage becomes longer. As a result, the output voltage of the corrective transformer 69 is raised, and continues to climb up until the final high voltage output reaches the specified voltage, thereby operating to stabilize.

This circuit constitution is simple because the blanking pulse which is the output of the winding 9 is used as the switching pulse and comparative waveform for PWM operation.

However, since the blanking pulse of the switching winding 9 is used for switching, the circuit constitution has demerits, that is:

the ON time more than the pulse width is not obtained, the horizontal deflecting operation frequency and high voltage maximum output power are lowered especially when the frequency is low, and the control range is narrow. In this circuit constitution, further, the blanking pulse width is very narrow as compared with the horizontal deflecting period, there is a non-saturation state in which switching is not secure, and the loss is increased.

This circuit constitution is small in the electric power handled by the corrective transformer, but generation of oscillating current and voltage is same as in the examples shown in FIG. 10, FIG. 11 and FIG. 12, and it is required to suppress.

SUMMARY OF THE INVENTION

It is hence an object of the invention to present a high voltage generator of high efficiency and low cost, in which:

one switching element is used for high voltage control, the PWM switching control circuit is composed in a simple constitution while synchronizing with the operation frequency of the horizontal deflecting circuit, and the OFF time oscillating voltage and ON time oscillating current of the switching element are suppressed.

The high voltage generating circuit of the invention comprises:

a high voltage generating transformer having a primary winding and a high voltage generating winding, and a switching element.

The high voltage generating circuit of the invention comprises:

synchronizing switching means to the horizontal operation frequency, and high voltage stabilizing means, being a converter circuit for converting the blanking pulse winding voltage obtained from the deflecting transformer or deflecting yoke for composing the deflecting circuit into a comparative waveform for control for obtaining a specified switching ON time by the horizontal deflecting operation frequency, further comprising:

a circuit for controlling the ON time of the switching element by changing the DC bias voltage of the comparative output waveform, and comparing with the threshold voltage of the comparator or switching element, and suppressing means of oscillating components.

BRIEF DESCRIPTION OF THE DRAWINGS

FIG. 6 is a conversion waveform diagram into blanking pulse and dummy triangular wave of the invention.

DESCRIPTION OF THE PREFERRED EMBODIMENTS

Figure 1:
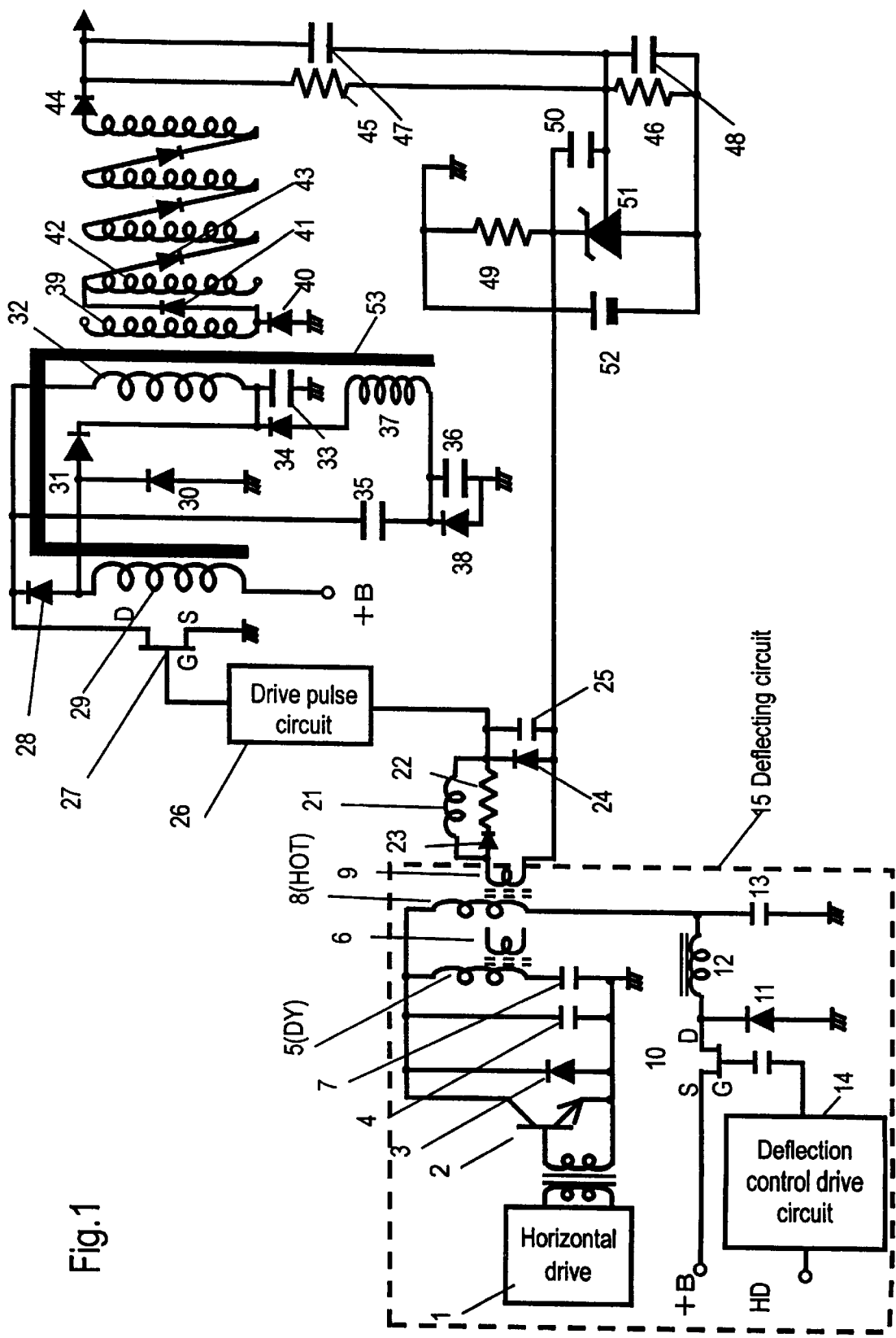
FIG. 1 is an explanatory diagram of a high voltage generating circuit in embodiment 1 of the invention.

Prior to explanation of operation of such high voltage generating circuit, the requirements of the high voltage generating circuit are described below, assuming that the high voltage generating circuit is used in a high frequency multiscan monitor for computer.

(1) The high voltage generating circuit is, in the constant supply voltage condition, preferred to operate as follows:

the operation frequency is synchronized with the horizontal deflecting operation frequency for prevention of beat fault (image flickering), and the output voltage to be supplied to the CRT is nearly the same at each operation frequency.

(2) The high voltage generating circuit is preferred to be:

small in oscillating voltage and oscillating current during operation, and small in effects on control circuit, deflecting circuit and other circuits.

(3) The high voltage generating circuit is further preferred to be:

simple in circuit constitution, and small in the number of parts, and high in high voltage generation efficiency, and low in cost.

EMBODIMENT 1

A high voltage generating circuit of embodiment 1 is described below while referring to the drawings.

FIG. 1 is a high voltage generating circuit showing embodiment 1 of the invention. In FIG. 1, a switching element 27 is a field effect transistor (MOSFET). A power source winding 29 is connected to the drain of the switching element 27 through a diode 28. The power source winding 29 is also connected to a smoothing capacitor 33 and a low voltage terminal of a primary winding 32 of high voltage transformer through a rectifying diode 31. A damper diode 30 is connected between the power source winding 29 and the ground. Other end of the primary winding 32 is connected to the drain of the switching element 27.

A clamping diode 38, a regenerative winding 37, and a clamping diode 34 are connected in series. The anode of the diode 38 of the series circuit is grounded. The cathode of the diode 34 of this series circuit is connected to the smoothing capacitor 33. A capacitor 36 is connected parallel to the diode 38. A capacitor 35 is connected between the cathode of the diode 38 and the drain of the switching element 27. Thus, the primary side switching circuit is composed.

Next, the constitution for driving the gate of the switching element 27 is described below.

To the positive polarity side of either the floating winding 6 or winding 9 of the deflecting circuit 15, the anode of the diode 23 is connected, and a resistance 22 is connected in series to the cathode.

An inductor 21 is connected parallel at both ends of a series circuit of the diode 23 and resistance 22.

As shown in FIG. 1, to the negative polarity side of the winding 6 or winding 9, the cathode side of the parallel circuit of diode 24 and capacitor 25 is connected, and the anode side is connected to other end of the circuit composed of resistance 22, diode 23, and inductor 21.

The output of thus constituted converter circuit is connected to the gate of the switching element 27 through the driving pulse circuit 26. Or the output of the converter circuit is connected directly to the gate of the switching element 27.

The negative polarity side of the winding 6 or winding 9 is constituted to:

be connected to the output (load resistance 49) of an inversion error amplifier 51 operating on a negative power source 52, and control the DC bias voltage.

The high voltage detecting circuit is constituted as a ladder circuit composed of resistances 45, 46 and capacitors 47, 48.

The low voltage terminal side of the detecting circuit is connected to the negative terminal of the negative power source 52. The divided detection voltage is applied to the detecting terminal of the inversion error amplifier 51. The anode of the inversion error amplifier 51 is connected to the negative power source 52. The feedback system of stabilizing operation of high voltage by high voltage detection is thus constituted.

Figure 5:
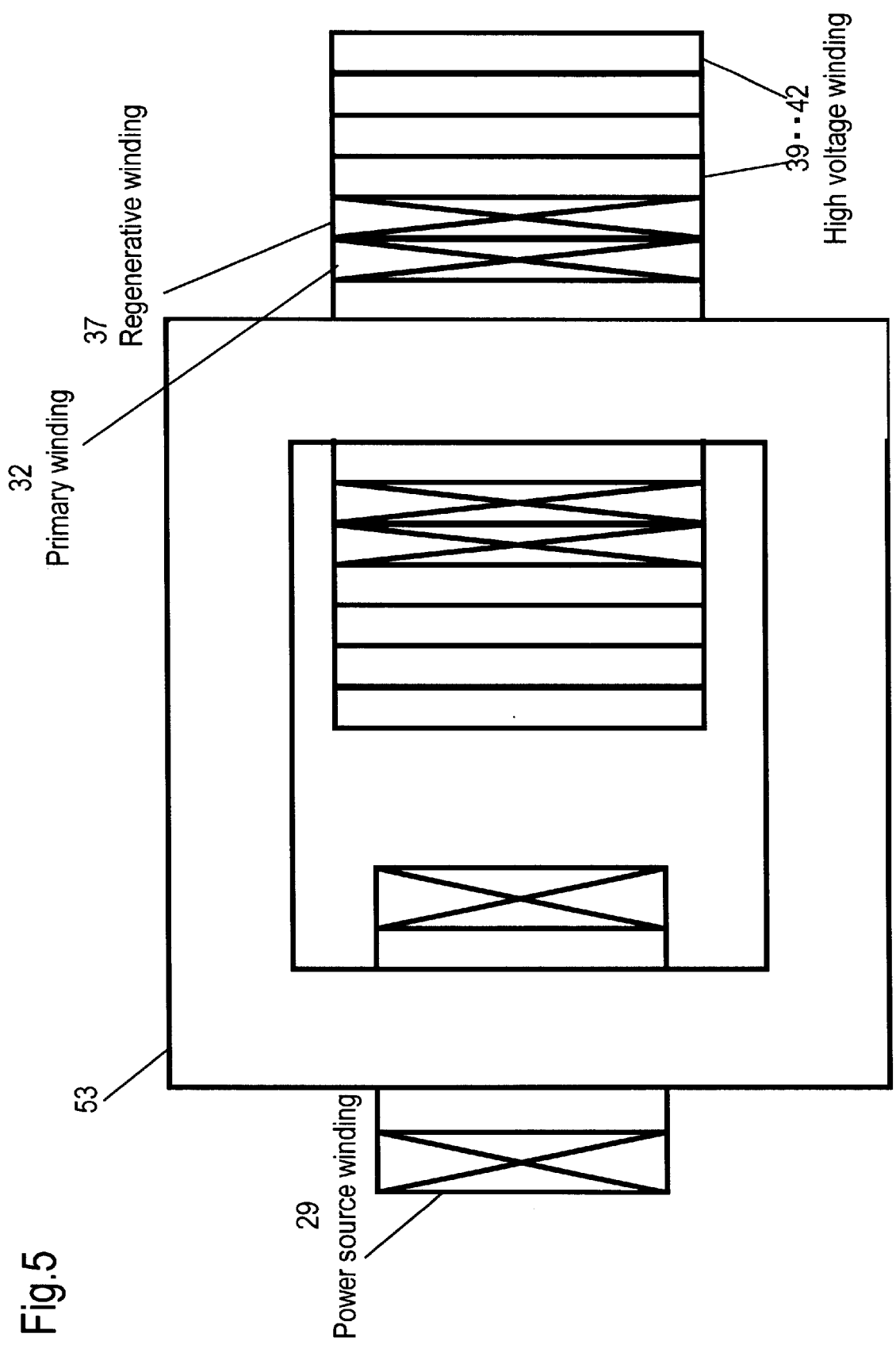
FIG. 5 is a winding structural diagram of a high voltage generating transformer in embodiment 1 of the invention.

As shown in FIG. 5, the high voltage windings 39, 42, . . . of the high voltage generating transformer are laminate windings wound coaxially in the same direction on the primary winding 32.

The high voltage rectifying circuit is described below.

The high voltage rectifying circuit has a constitution in which:

the anode of a high voltage rectifying diode 40 is grounded, the cathode of the high voltage rectifying diode 40 is connected to the low potential side of the first layer 39 of the high voltage winding, the anode of a high voltage rectifying diode 41 is connected to its junction, the cathode of the high voltage rectifying diode 41 is connected to the high potential side of the second layer 42 of the high voltage winding, the anode of a high voltage rectifying diode 43 is connected to the high potential side of the second layer 42 of the high voltage winding, the cathode of the high voltage rectifying diode 43 is connected to the low potential side of the third layer of the high voltage winding, and in the subsequent winding layers, the winding and the high voltage rectifying diode are connected in series in the normal direction, and from the high potential side of the final winding layer, a high voltage is produced through a high voltage diode 44.

The operation of the high voltage generating circuit of the embodiment is same as that of on/off converter.

Its output power P is expressed in the following formula (where L is the inductance, I is the current, and f is the frequency).

$$P = \tfrac{1}{2} L I^2 f \quad (1)$$

In multiscan operation, in the condition of constant supply voltage and constant L, and at the horizontal deflecting operation frequency f [Hz] of, for example, 30 to 90 kHz (if changing three times).

In order to obtain the same output voltage, from formula (1), the current when the frequency is 30 kHz is 1.73 times the current when it is 90.kHz (the square root of the ratio of frequencies).

That is, the ON time of the switching element 27 must be changed depending on the operation frequency. This is an important point of multiscan operation.

The operation of the high voltage generator is described below.

The deflecting circuit 15 forms a deflecting current by means of horizontal transistor 2, deflecting yoke 5, damper diode 3, and deflecting transformer (HOT) 8.

The blanking pulse voltage occurring in the blanking period is generated from the winding 6 or winding 9 magnetically coupled to the deflecting transformer 8 or deflecting yoke 5.

The generated voltage of the winding 6 or winding 9 is fed into a converter circuit composed of inductor 21, diodes 23, 24, resistance 22, and capacitor 25.

The output of the converter circuit is a dummy triangular wave output including the resonance as shown in FIG. 6.

In the rising positive portion of the blanking pulse, the diode 23 conducts, and the capacitor 25 is charged through the resistance 22. When the blanking pulse reaches the peak and begins to decline, the capacitor 25 begins to discharge through the inductor 21. When the blanking pulse becomes negative, the diode 24 conducts. At this moment, the wave is sliced by the voltage in the normal direction.

By setting longer the resonance frequency of the inductor 21 and capacitor 25, a wider pulse than the blanking pulse is obtained. Moreover, when the operation frequency is lower, a dummy triangular wave of a broader pulse width is obtained.

By setting the inductor 21 at 2.2 mH and the capacitor 25 at 0.018 ?F, the measured values are shown in Table 1 (operation frequency: 31.5 and 93.7 kHz).

TABLE 1

| Measured Value Operation Frequency | Deflected blanking pulse voltage [Vpp] | Deflected blanking pulse width [μsec] | Dummy triangular wave voltage [Vpp] | Dummy triangular wave pulse width [μsec] |
| --- | --- | --- | --- | --- |
| 31.47 [kHz] | 12 | 2.0 | 7.0 | 6.2 |
| 68.68 [kHz] | 12 | 2.0 | 7.0 | 4.0 |
| 93.72 [kHz] | 12 | 2.0 | 7.0 | 3.3 |

Figure 3:
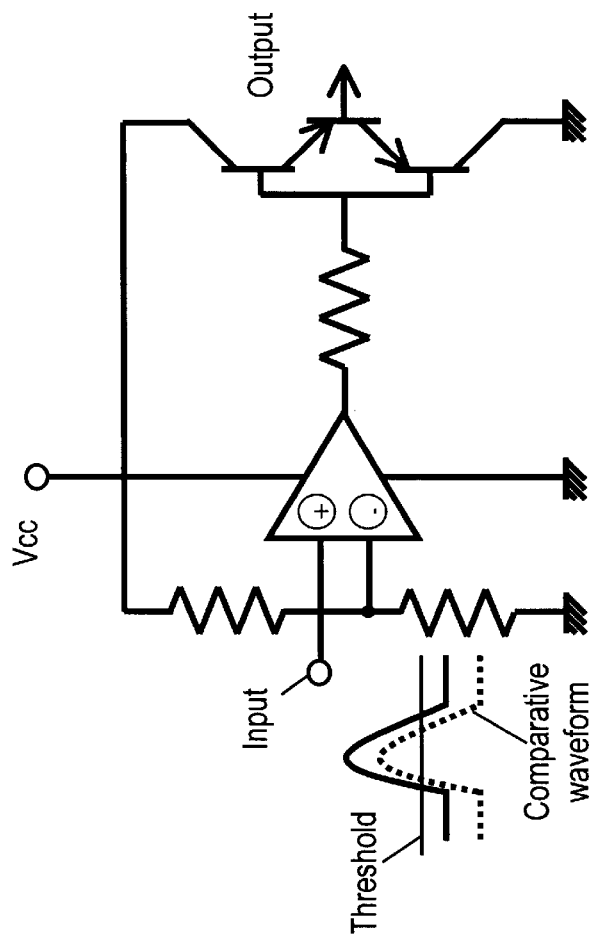
FIG. 3 is an output characteristic diagram of a converter circuit of the invention.

These results are graphically expressed in FIG. 3.

When the deflecting operation frequency f [Hz] is, for example, 30 to 90 kHz (when changing three times), the ratio of the pulse width of dummy triangular wave is about 1.7 times. It nearly satisfies the relation of the operation frequency and necessary pulse width mentioned above.

When this dummy triangular wave is used as the comparative wave for control and switching pulse, the high voltage generator of the invention has the following advantages:

synchronized switching with deflecting frequency, prevention of noise by ON start in deflecting blanking period, prevention of spot seizing of CRT by start of operation of high voltage generation after deflecting operation, and frequency of maximum ON time.

Consequently, this dummy triangular wave is applied to the gate of the switching element 27 either through comparator and pulse drive circuit 26, or directly.

On the other hand, the negative polarity side of the winding 6 or winding 9 is connected to the output end of the inversion error amplifier 51 which operates on the negative power source 52.

As the switching element 27, herein, a field effect transistor (MOSFET) is used.

This switching element 27 is a voltage-driven type switching element which is turned on when the gate voltage is higher than the threshold voltage in relation to the source, and turned off when the gate voltage is lower than the threshold voltage in relation to the source.

When the output of the inversion error amplifier 51 becomes higher (the output voltage is close zero volt), the DC bias voltage of the dummy triangular wave is raised. When the DC bias voltage is higher than the threshold voltage, the switching element is turned on.

This operation is a comparator operation of dummy triangular wave and threshold voltage. Therefore, the ON time can be controlled by the DC bias voltage.

Figure 4:
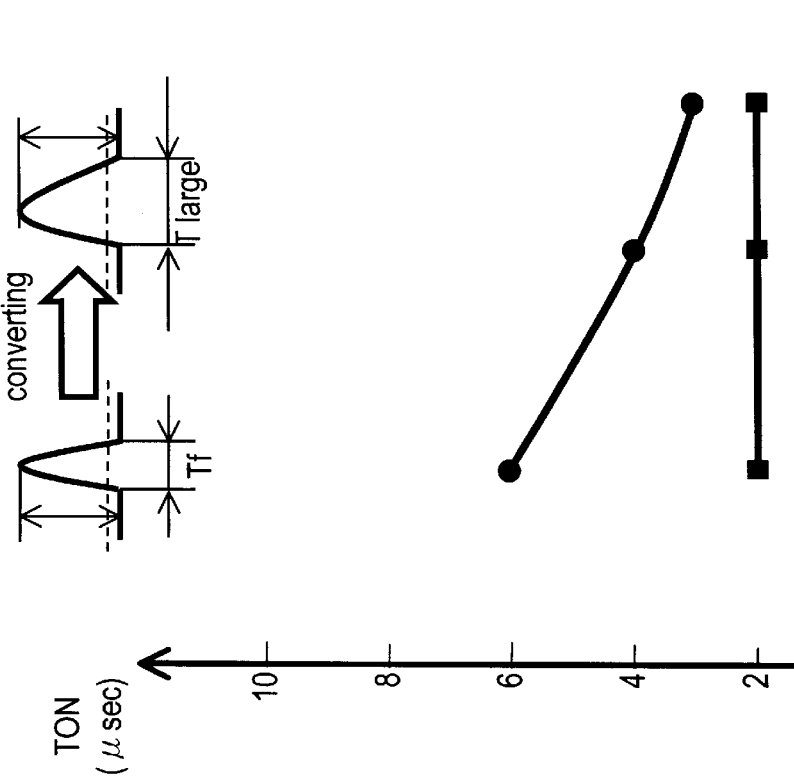
FIG. 4 is a pulse drive circuit diagram of the invention.

The drive pulse circuit 26 is composed of comparator and buffer operating in such manner, and is used when the switching capacity is insufficient. An example of such drive pulse circuit 26 is shown in FIG. 4.

The stabilizing operation of the high voltage is explained below. 10 For example, when the high voltage load current increases and the high voltage output declines, the terminals voltage of the resistance 46 of the high voltage detecting circuit also falls. This signal is fed into the detection end of the inversion error amplifier 51, and the output of the inversion error amplifier 51 being compared with the internal reference voltage and amplified approaches zero volt.

As explained herein, in the high voltage generator of the invention, the ON time of the switching element 27 is long, the current of the primary side 32 of the high voltage generating transformer increases, the flyback pulse voltage generated when the switching element 27 is turned off is also raised, and the high voltage output elevates up to the specified value.

When the high voltage becomes higher, the high voltage generator of the invention operates in the opposite direction of the above, and high voltage stabilization is controlled.

By this operation, the high voltage generator of the invention performs feedback control for comparing the output voltage and reference voltage, copes with changes of operation frequency, and realizes stabilization control of high voltage.

In addition, the high voltage generator of the invention determines the maximum ON time depending on the operation frequency, and therefore it can also determine limitation of maximum output, maximum value of switch current, and also operates protectively.

Next is described suppression of oscillating voltage generated when the switching element 27 is turned off.

In the example in FIG. 1, two operations bring about the effects (suppression of oscillating voltage and auxiliary operation of high voltage control).

The first operation is the operation of the step-up converter in the power source winding 29. The power source +B is connected from the power source winding 29 to the drain of the switching element 27 through a diode switch 28. The switching element 27 is responsible for switching operation. On the other hand, from the power source winding 29, the smoothing capacitor 33 is charged through a rectifying diode 31. The charged voltage is switched through the primary winding 32. In this case, a flyback voltage is generated in the primary winding 32 by inductance and distributed capacity. However, by the reverse blocking effect of the diode 28, this flyback voltage is not applied to the power source winding 29. Or, as shown in FIG. 5, since the power source winding 29 and primary winding 32 are connected to both legs of the U-shaped core 53, the degree of coupling is set low (about 0.7). Therefore, by setting the step-up converter of the power source winding 29 in the continuous mode, the voltage crest value of the power source winding 29 becomes the charged voltage of the smoothing capacitor 33, and the voltage of the power source winding is a rectangular wave (as shown in FIG. 8).

On the other hand, the flyback pulse of the primary winding 32 is transmitted to the high voltage side. The boosted flyback pulse is rectified at the high voltage winding side. The rectified voltage oscillates. However, since the voltage crest value of the power source winding 29 is clamped, the oscillating voltage is suppressed below a specific level.

Depending on the ON time, the voltage of the smoothing capacitor 33 varies, and therefore when controlling, for example, to raise the high voltage, the voltage of the smoothing capacitor 33 also rises. The voltage elevation of the capacitor 33 is an auxiliary operation to the control for elevating the high voltage. An outline of this operation waveform is shown in FIG. 8.

Figure 8:
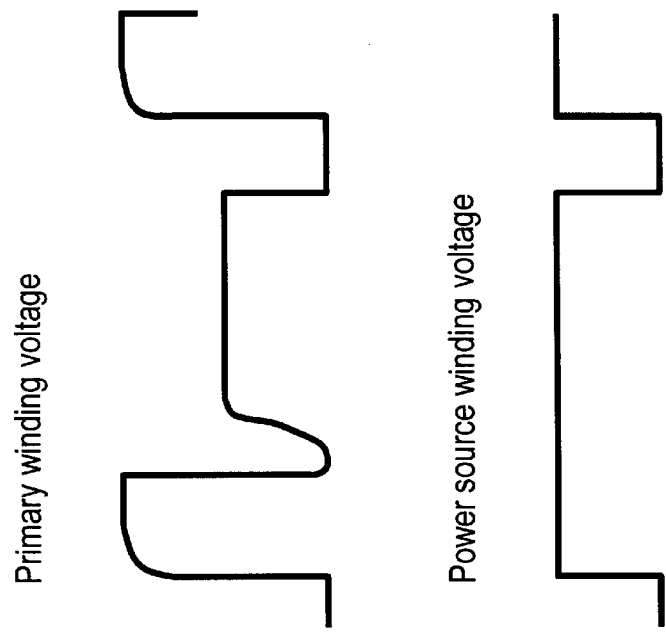
FIG. 8A is an operation waveform diagram of the invention, showing an example of low operation frequency.
FIG. 8B is an operation waveform diagram of the invention, showing an example of high operation frequency.
Figure 13:
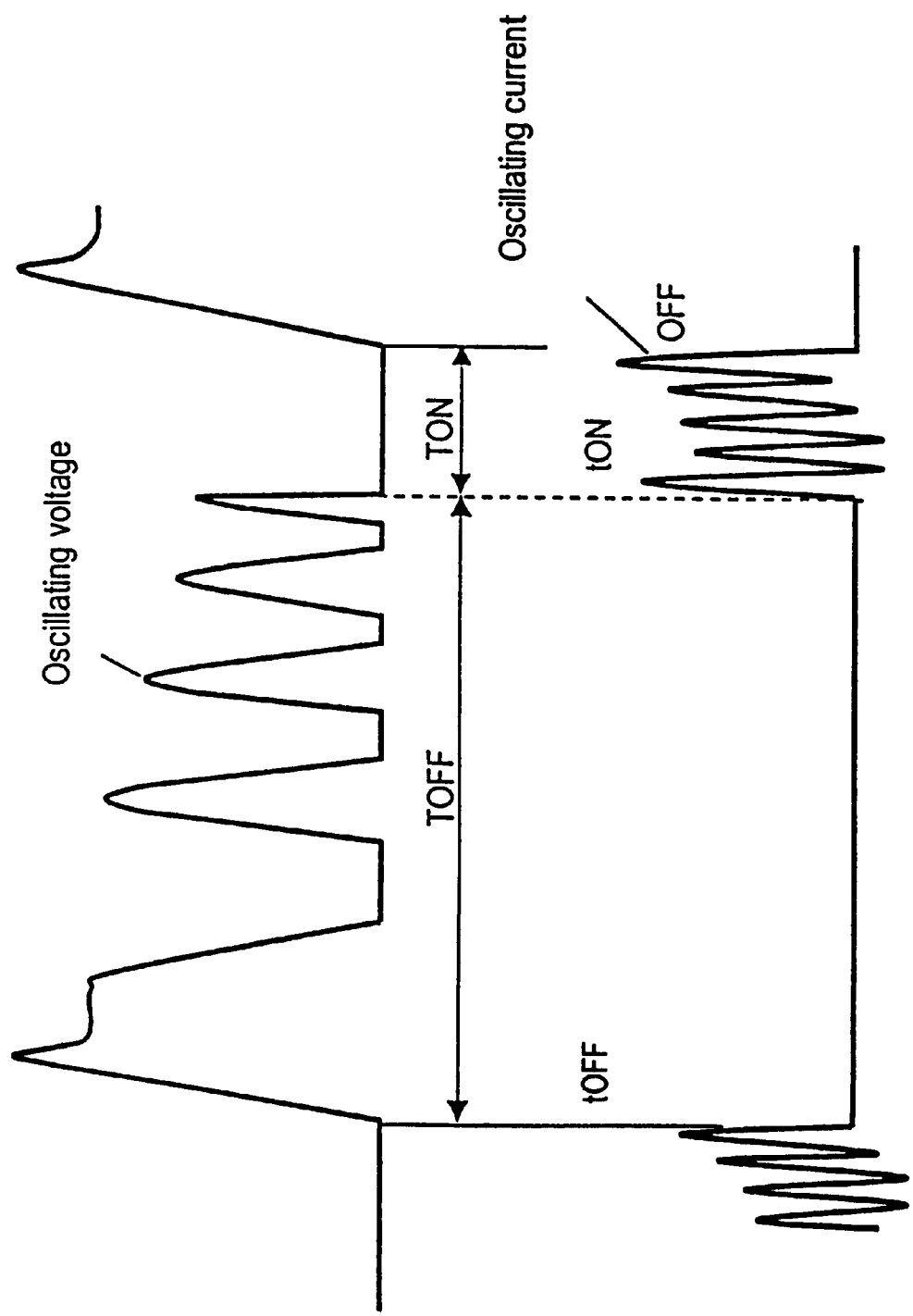
FIG. 13 is an example of operating voltage and current waveform of a high voltage generating circuit of prior art.

As shown in FIG. 8, violent oscillating voltage as shown in FIG. 13 is not generated. Accordingly, when the switch 27 is turned on, high peak current does not flow momentarily. It is therefore free from generation of image noise or adverse effects on control operation (oscillation, malfunction).

The second operation is the energy regenerative operation to the smoothing capacitor 33 or supply voltage +B through the regenerative winding 37 and regenerating diodes 38, 34 connected at both ends.

In this operation, the energy of the flyback pulse generated in the primary winding 32 is transmitted from the high voltage rectifying circuit to the secondary side. During this operation, the extra energy accumulated in the system through the regenerative winding 37 is regenerated.

By regenerating the extra energy, the constitution of the embodiment is effective to decrease the oscillating energy, and suppress the oscillating voltage.

Besides, when the switching element 27 is turned off and the drain voltage is raised, this drain voltage is applied to the capacitor 36 through the capacitor 35. By this operation, the diode 38 has an inverse bias, and is turned off. Through the capacitor 35, the drain voltage is applied to the capacitor 36 at the low potential side of the regenerative winding 37. Before the voltage across the regenerative winding becomes higher than the smoothing capacitor 33 or supply voltage +B, the diode 34 conducts. This is the first regenerative operation. By the first regenerative operation, the capacitor 36 starts to discharge and becomes zero volt. When the voltage of the capacitor 36 becomes zero volt, the voltage across the regenerative winding 37 climbs up, the diodes 38 and 34 conduct, thereby starting a second regenerative operation.

Before the diode 34 conducts, the capacitors 35, 36 are connected in series to the drain of the switching element 27. When the diode 34 conducts, the capacitor 35 is connected to the power source through the regenerative winding 37. After conduction of the diode 34, only the capacitor 35 is active, and the capacity increases more than the combined capacity of capacitors 35 and 36 before conduction of the diode 34. By making use of increase of operation capacity, it is set to start clamp operation after a moderate resonance. As a result, the oscillating voltage can be suppressed. In particular, the ringing voltage generated in the high voltage winding causes to elevate the high voltage in no-load state, but the constitution of the embodiment can prevent generation of such ringing voltage.

Figure 7:
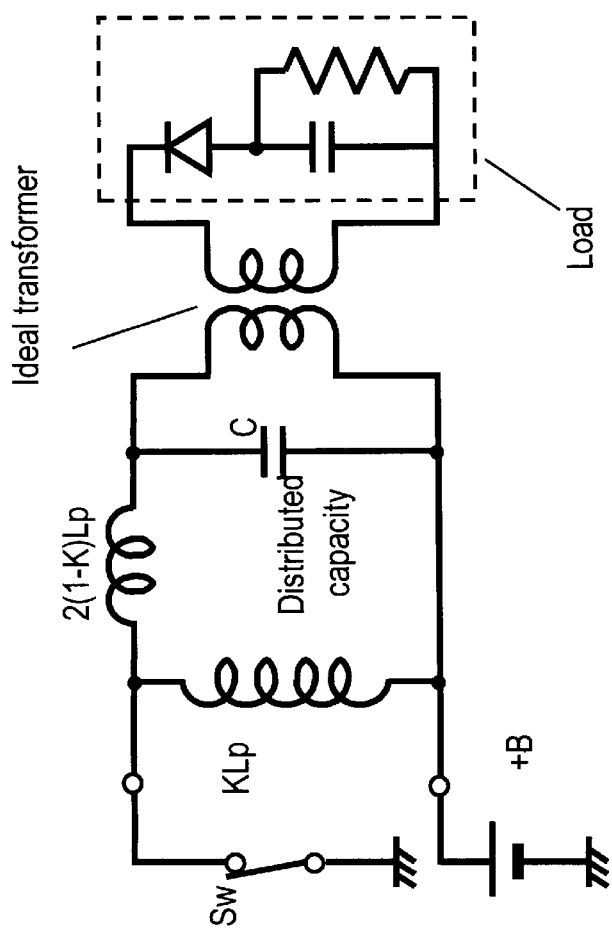
FIG. 7 is an equivalent circuit diagram of a high voltage generating transformer of the invention.

Below is described suppression of oscillating current generated when the switching element 27 is turned on. When the switch is turned on, the equivalent circuit is as shown in FIG. 7. Since a resonance current flows in the distributed capacity of the high voltage transformer and the series circuit of leakage inductance, an oscillating current also flows in the drain current of the primary side. As preventive measure of oscillating current, as shown in FIG. 7, this is a method of suppressing oscillation by disposing an energy consuming circuit at the secondary side when turning on the switch.

For this purpose, an ON period rectifying circuit is provided at the secondary side of the high voltage generating transformer in FIG. 1. The high voltage rectifying diode 41 rectifies the ON period, and the charging capacitor makes use of the capacity between the windings 39 and 42. On the other hand, the OFF period voltage is rectified by the high voltage rectifying diode 43, and is charged to the capacity between the windings 43 and 42. What corresponds to the load resistance is the equivalent resistance corresponding to the high voltage detection resistances 45, 46 and beam current. The detection resistance is generally a large value (hundreds of ohms) and the effect is small, but the effect increases when the beam current increases. A similar effect is obtained by connecting a resistance between the windings 39 and 42. The high voltage rectifying diode 40 is a diode for dividing the pulse voltage of the high voltage winding into positive and negative polarity, and it has an effect of decreasing the distributed capacity, and is effective for suppressing the oscillation component.

In the conventional method (without ON period rectifying circuit), the ON period portion of the pulse voltage of the high voltage winding does not contribute as high voltage output, but by the addition of this ON period rectifying circuit, it can contribute to the high voltage output, and the efficiency as the high voltage transformer can be enhanced.

Moreover, the constitution of the embodiment suppresses the oscillation components, and therefore decreases
loss and heat generation of circuit elements by oscillating current, and
loss of transformer.

EMBODIMENT 2

A high voltage generating circuit of embodiment 2 is described below while referring to the drawings. Same reference numerals used in this embodiment refer to the corresponding components of embodiment 1 shown in FIG. 1.

Figure 2:
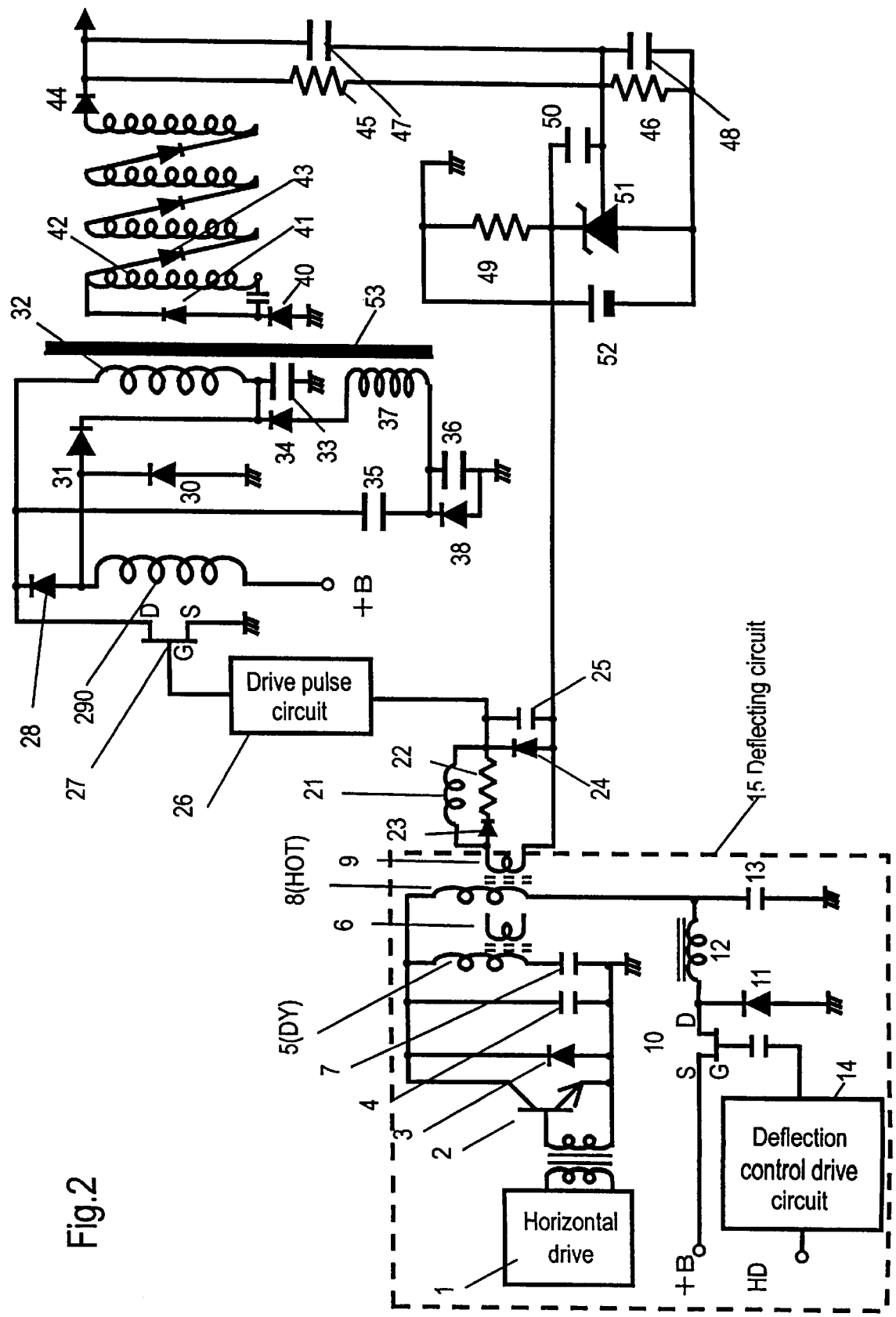
FIG. 2 is an explanatory diagram of a high voltage generating circuit in embodiment 2 of the invention.

In FIG. 2, as the switching element 27, a field effect transistor (MOSFET) is used. A power source winding 290 is connected to the drain of the switching element 27 through the diode 28, and is further connected to the smoothing capacitor 33 and low voltage terminal of the primary winding 32 of the high voltage transformer through the rectifying diode 31. The power source winding 290 and primary winding 32 are completely separated in magnetic coupling (0 degree of coupling). A damper diode 30 is connected between the power source winding 290 and the ground. The other end of the primary winding 32 is connected to the drain of the switching element 27.

A clamping diode 38, a regenerative winding 37, and a clamping diode 34 are connected in series. The anode of the diode 38 of this series circuit is grounded. The cathode of the diode 34 of this series circuit is connected to the smoothing capacitor 33. A capacitor 36 is connected parallel to the diode 38. A capacitor 35 is connected between the cathode of the diode 38 and the drain of the switching element 27. The switching circuit of the primary side is thus constituted.

The constitution for driving the gate of the switching element 27 is same as explained in embodiment 1, and its description is omitted.

The constitution of the high voltage detecting circuit is also same as explained in embodiment 1, and its description is omitted.

The operation of the high voltage generating circuit of the embodiment is same as that of on/off converter. Its operation is same as explained in embodiment 1, and its description is omitted.

Its output power P is expressed in the following formula (where L is the inductance, I is the current, and f is the frequency).

$$P = \frac{1}{2} L I^2 f \quad (1)$$

In multiscan operation,
in the condition of constant supply voltage and constant L, and
at the horizontal deflecting operation frequency f[Hz] of, for example, 30 to 90 kHz (if changing three times).
In order to obtain the same output voltage, from formula (1),
the current when the frequency is 30 kHz is 1.73 times the current when it is 90 kHz (the square root of the ratio of frequencies).

That is, the ON time must be changed depending on the operation frequency. This is an important point of multiscan operation. This point is also same as explained in embodiment 1, and its description is omitted.

The high voltage generator of embodiment 2 has many advantages including:
synchronized switching with deflecting frequency,
prevention of noise by ON start in deflecting blanking period,
prevention of spot seizing of CRT by start of operation of high voltage generation after deflecting operation, and
frequency of maximum ON time.
During stabilizing operation of high voltage,
for example, when the high voltage load current increases and the high voltage output declines, the voltage across the resistance 46 of the high voltage detecting circuit declines, and
this signal is fed into the detection end of the inversion error amplifier 51, and is compared with the internal reference voltage and is amplified, and the output of this inversion error amplifier 51 approaches zero volt.

This high voltage stabilizing operation is also same as explained in embodiment 1.

In the high voltage generator of embodiment 2,
the ON time of the switching element 27 is long,
the current of the primary side 32 of the high voltage generating transformer increases,
the flyback pulse voltage generated when the switching element 27 is turned off is also raised, and
the high voltage output elevates up to the specified value.

When the high voltage becomes higher, the high voltage generator of embodiment 2 operates in the opposite direction of the above, and high voltage stabilization is controlled.

The high voltage generator of embodiment 2
performs feedback control for comparing the output voltage and reference voltage,
copes with changes of operation frequency, and
realizes stabilization control of high voltage.

In addition, the high voltage generator of the invention determines the maximum ON time depending on the operation frequency, and therefore it can also determine limitation of maximum output, maximum value of switch current, and also operates protectively.

The above description of embodiment 2 is same as explained in embodiment 1.

Next is described suppression of oscillating voltage generated when the switching element 27 is turned off.

In the example in FIG. 2, two operations bring about the effects.

The first operation is the operation of the step-up converter in the power source winding 290. The power source +B is connected from the power source winding 290 to the drain of the switching element 27 through a diode switch 28.

The switching element 27 is responsible for switching operation. On the other hand, from the power source winding 290, the smoothing capacitor 33 is charged through a rectifying diode 31. The charged voltage is switched through the primary winding 32. In this case, a flyback voltage is generated in the primary winding 32 by inductance and distributed capacity. However, by the reverse blocking effect of the diode 28, this flyback voltage is not applied to the power source winding 290.

Besides, since the power source winding 290 and primary inding 32 are completely separated in magnetic coupling (0 degree of coupling), they do not interfere their operation mutually. In particular, when the power source winding is provided at one leg of the U-shaped core, if the switching element 27 is turned on, a current flows in the power source winding 290. By this current, the inductance of the primary winding of the high voltage transformer side decreases. Therefore, the peak value of the current flowing in the switching element increases. In embodiment 2, since the power source winding 290 and primary winding 32 are completely separated in magnetic coupling (0 degree of coupling), when the switching element 27 is turned on, a current flow in the power source winding 290. By this current, however, the inductance of the primary winding of the high voltage transformer side does not decrease. Therefore, the peak value of the current flowing in the switching element does not increase. In this constitution, the current capacity of the switching element 27 may be lowered. Accordingly, by setting the step-up converter operation of the power source winding 290 in the continuous mode operation, the voltage crest value of the power source winding 290 becomes the charged voltage of the smoothing capacitor 33, and the voltage of the power source winding is a rectangular wave (as shown in FIG. 8).

On the other hand, the flyback pulse of the primary winding 32 is transmitted to the high voltage side. The boosted flyback pulse is rectified at the high voltage winding side. The rectified voltage oscillates. However, since the voltage crest value of the power source winding 290 is clamped, the oscillating voltage is suppressed below a specific level. Depending on the ON time, the voltage of the smoothing capacitor 33 varies, and therefore when controlling, for example, to raise the high voltage, the voltage of the smoothing capacitor 33 also rises. The voltage elevation of the capacitor 33 is an auxiliary operation to the control for elevating the high voltage. An outline of this operation waveform is shown in FIG. 8.

As shown in FIG. 8, violent oscillating voltage as shown in FIG. 13 is not generated. Accordingly, when the switch 27 is turned on, high peak current does not flow momentarily. It is therefore free from generation of image noise or adverse effects on control operation (oscillation, malfunction).

The second operation is the energy regenerative operation to the smoothing capacitor 33 or supply voltage +B through the regenerative winding 37 and regenerating diodes 38, 34 connected at both ends.

In this operation, the energy of the flyback pulse generated in the primary winding 32 is transmitted from the high voltage rectifying circuit to the secondary side. During this operation, the extra energy accumulated in the system through the regenerative winding 37 is regenerated.

By regenerating the extra energy, the constitution of the embodiment is effective to decrease the oscillating energy, and suppress the oscillating voltage.

Besides, when the switching element 27 is turned off and the drain voltage is raised, this drain voltage is applied to the capacitor 36 through the capacitor 35. By this operation, the diode 38 has an inverse bias, and is turned off. Through the capacitor 35, the drain voltage is applied to the capacitor 36 at the low potential side of the regenerative winding 37. Before the voltage across the regenerative winding becomes higher than the smoothing capacitor 33 or supply voltage +B, the diode 34 conducts. This is the first regenerative operation. By the first regenerative operation, the capacitor 36 starts to discharge and becomes zero volt. When the voltage of the capacitor 36 becomes zero volt, the voltage across the regenerative winding 37 climbs up, the diodes 38 and 34 conduct, thereby starting a second regenerative operation.

Before the diode 34 conducts, the capacitors 35, 36 are connected in series to the drain of the switching element 27. When the diode 34 conducts, the capacitor 35 is connected to the power source through the regenerative winding 37. After conduction of the diode 34, only the capacitor 35 is active, and the capacity increases more than the combined capacity of capacitors 35 and 36 before conduction of the diode 34. By making use of increase of operation capacity, it is set to start clamp operation after a moderate resonance. As a result, the oscillating voltage can be suppressed. In particular, the ringing voltage generated in the high voltage winding causes to elevate the high voltage in no-load state, but the constitution of the embodiment can prevent generation of such ringing voltage.

Below is described suppression of oscillating current generated when the switching element 27 is turned on. When the switch is turned on, the equivalent circuit is as shown in FIG. 7. Since a resonance current flows in the distributed capacity of the high voltage transformer and the series circuit of leakage inductance, an oscillating current also flows in the drain current of the primary side. As preventive measure of this, as shown in FIG. 7, it is an effective method of suppressing oscillation to dispose an energy consuming circuit at the secondary side when turning on the switch. For this purpose, as shown in FIG. 2, an ON period rectifying circuit is provided at the secondary side of the high voltage generating transformer. The high voltage rectifying diode 41 rectifies the ON period, and the charging capacitor has a capacitor 53. On the other hand, the OFF period voltage is rectified by the high voltage rectifying diode 43, and is charged in the capacitor 53. What corresponds to the load resistance is the equivalent resistance corresponding to the high voltage detection resistances 45, 46 and beam current. The detection resistance is generally a large value (hundreds of ohms) and the effect is small, but the effect increases when the beam current increases. A similar effect is obtained by connecting a resistance to both ends of the capacitor 53. The high voltage rectifying diode 40 is a diode for dividing the pulse voltage of the high voltage winding into positive and negative polarity, and it has an effect of decreasing the distributed capacity, and is effective for suppressing the oscillation component.

In the conventional method (without ON period rectifying circuit), the ON period portion of the pulse voltage of the high voltage winding does not contribute as high voltage output, but by the addition of this ON period rectifying circuit, it can contribute to the high voltage output, and the efficiency as the high voltage transformer can be enhanced.

Moreover, the constitution of the embodiment suppresses the oscillation components, and therefore decreases loss and heat generation of circuit elements by oscillating current, and loss of transformer.

EMBODIMENT 3

Figure 9:
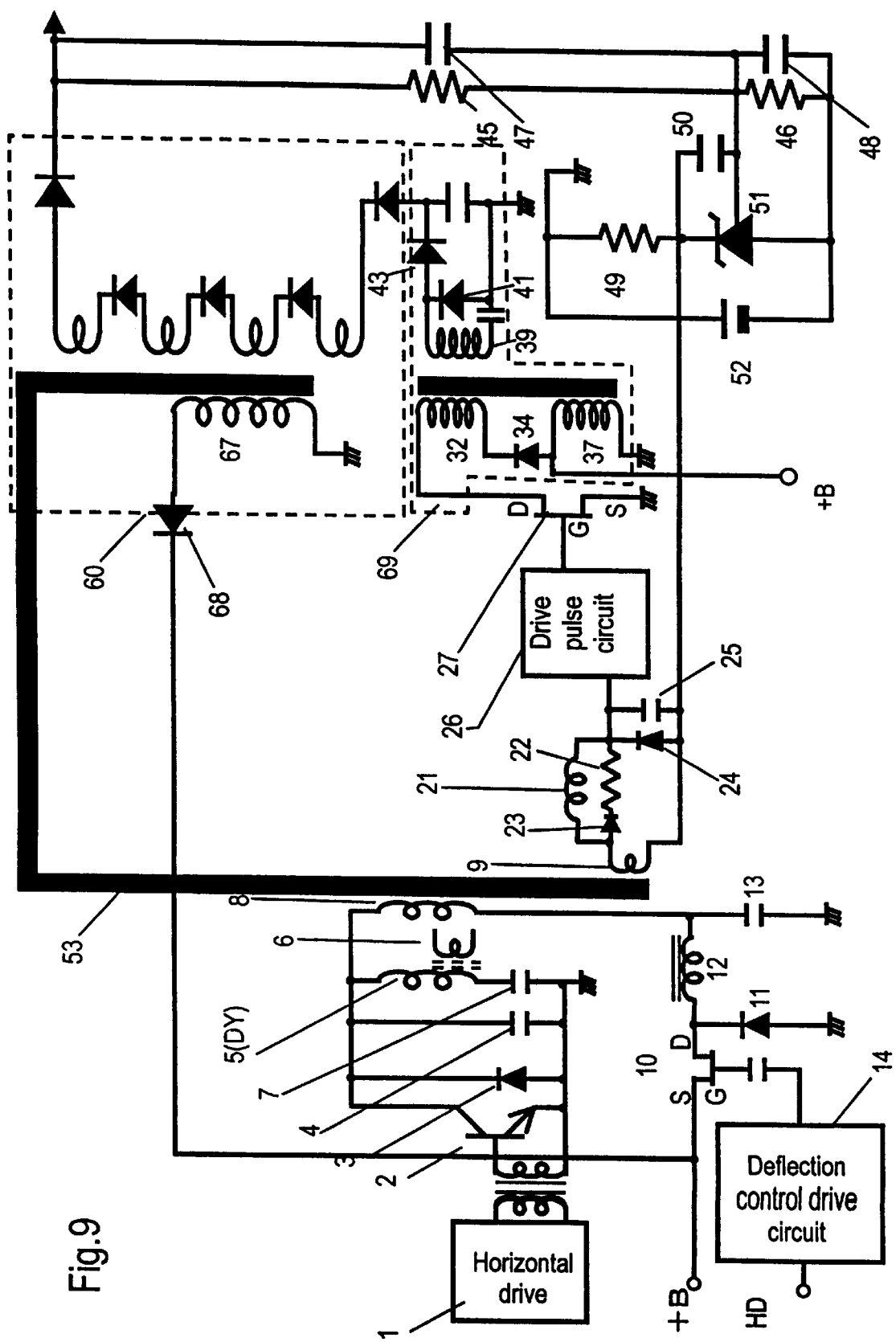
FIG. 9 is a diagram of a deflecting and high voltage integrated circuit in embodiment 3 of the invention.
Figure 10:
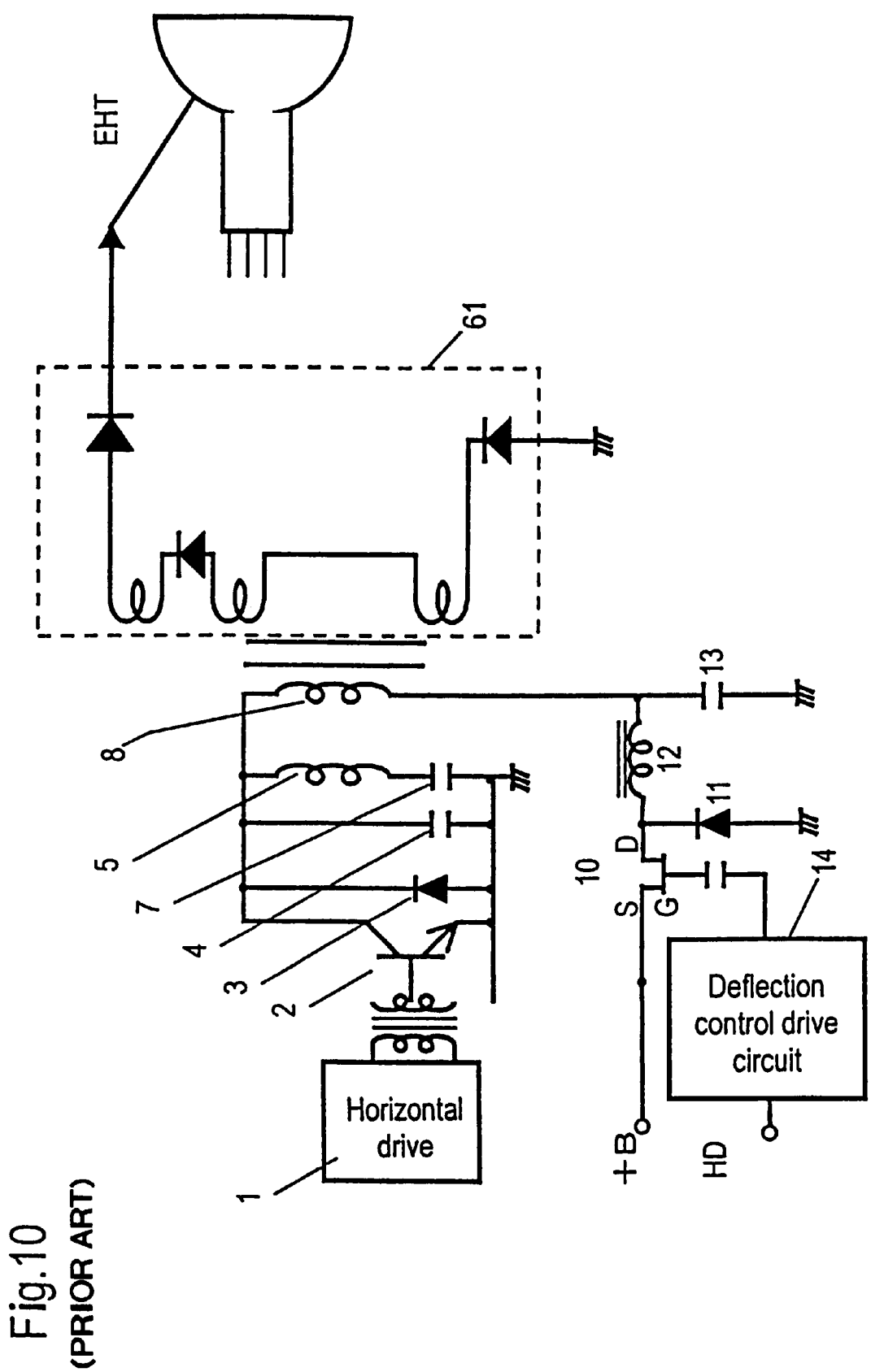
FIG. 10 is an explanatory diagram of deflecting circuit and high voltage generating function of prior art.
Figure 11:
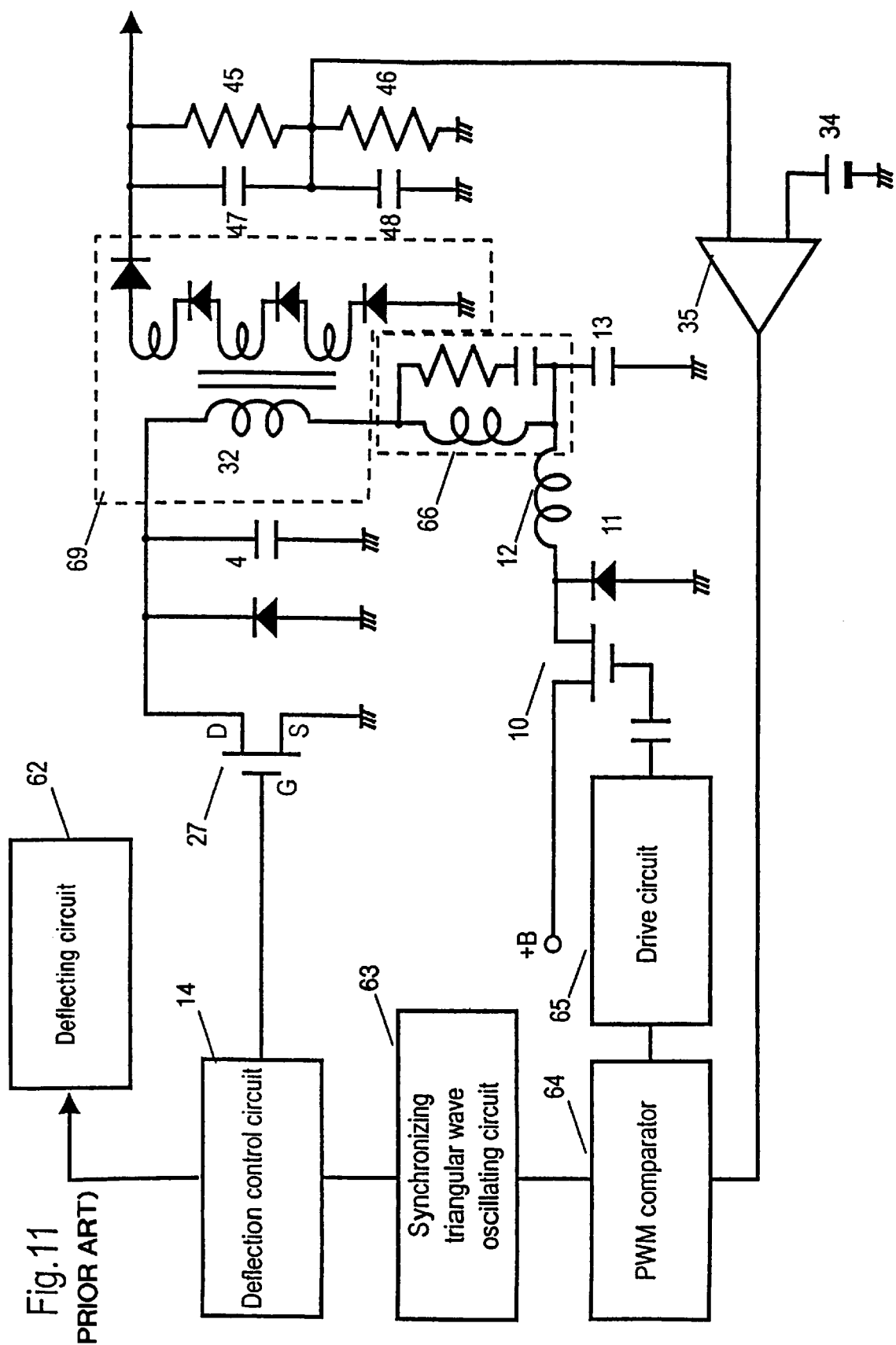
FIG. 11 is an explanatory diagram of a high voltage generating circuit of prior art.
Figure 12:
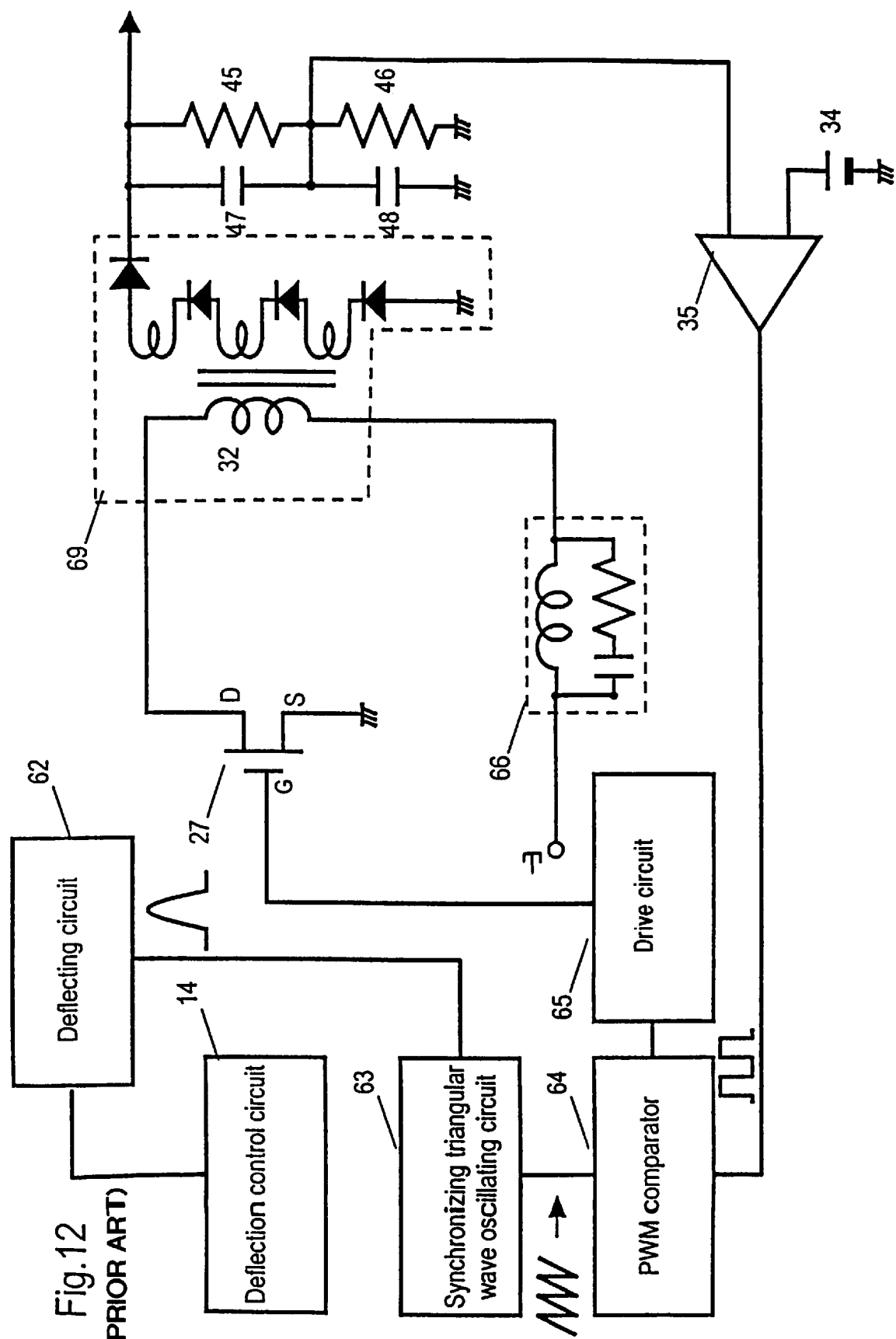
FIG. 12 is an explanatory diagram of a high voltage generating circuit of prior art.
Figure 14:
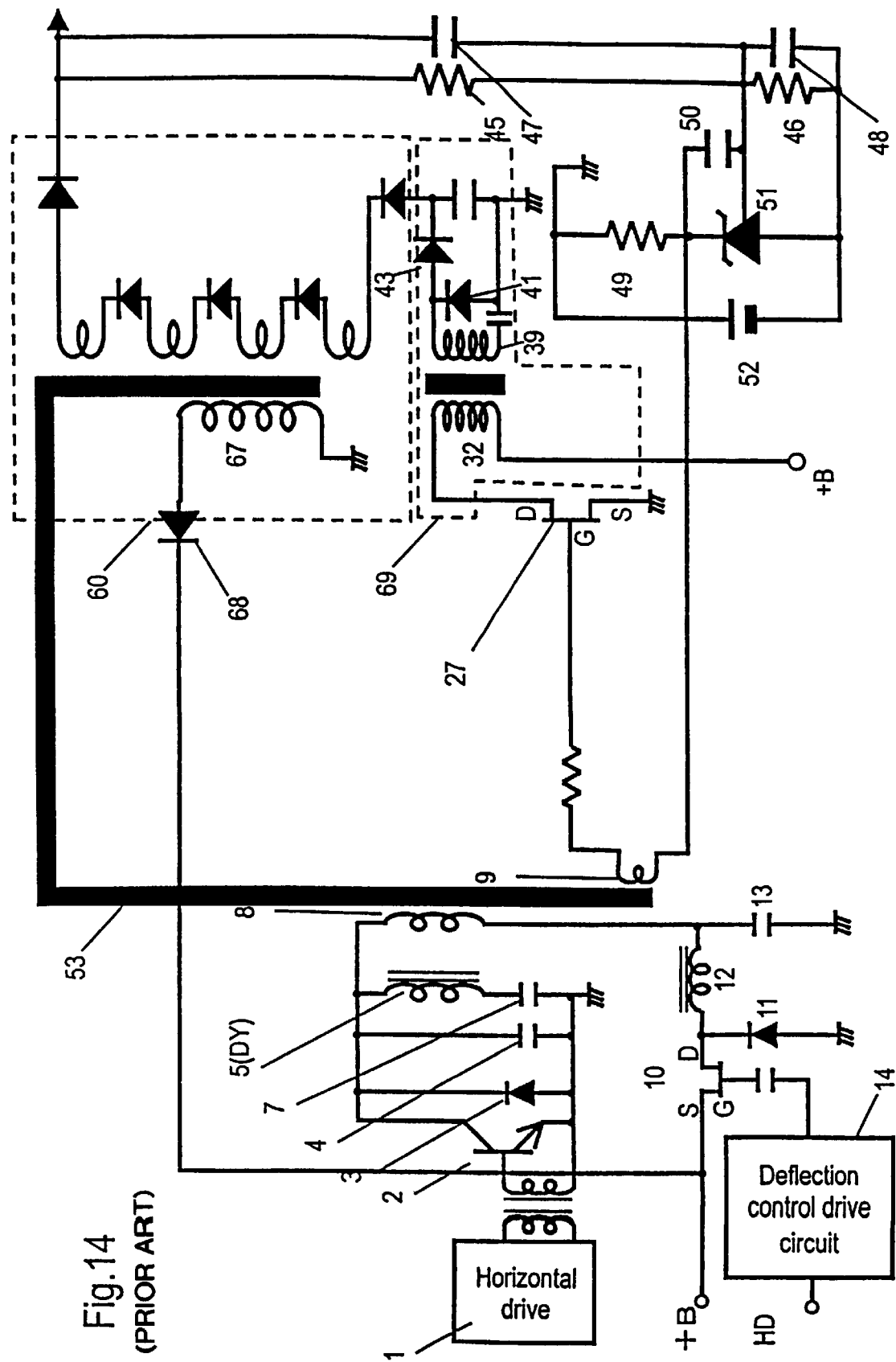
FIG. 14 is an explanatory diagram of a deflecting high voltage generating circuit of prior art.

In embodiment 3, the invention is applied in a deflecting and high voltage integrated circuit as shown in FIG. 9. The constitution in FIG. 9 is realized by applying the invention in addition to the high voltage corrective transformer 69 shown in the explanation of the prior art (FIG. 14).

That is, the circuit for converting the blanking pulse is constituted as follows.

To the positive polarity side of either the floating winding 6 or winding 9 of the deflecting circuit 15, the anode of the diode 23 is connected, and a resistance 22 is connected in series to the cathode.

An inductor 21 is connected parallel at both ends of a series circuit of the diode 23 and resistance 22.

As shown in FIG. 1, to the negative polarity side of the winding 6 or winding 9, the cathode side of the parallel circuit of diode 24 and capacitor 25 is connected, and the anode side is connected to other end of the circuit composed of resistance 22, diode 23, and inductor 21.

The output of thus constituted converter circuit is connected to the gate of the switching element 27 through the driving pulse circuit 26. Or the output of the converter circuit is connected directly to the gate of the switching element 27.

The negative polarity side of the winding 6 or winding 9 is constituted to:
be connected to the output (load resistance 49) of the inversion error amplifier 51 operating on the negative power source 52, and
control the DC bias voltage.

The high voltage detecting circuit is constituted as a ladder circuit composed of resistances 45, 46 and capacitors 47, 48.

The low voltage terminal side of the detecting circuit is connected to the negative terminal of the negative power source 52. The divided detection voltage is applied to the detecting terminal of the inversion error amplifier 51. The anode of the inversion error amplifier 51 is connected to the negative power source 52. The feedback system of stabilizing operation of high voltage by high voltage detection is thus constituted.

The object of the high voltage control is controlled so that the sum of the output of the first high voltage generating transformer 60 and the output of the high voltage corrective transformer 69 may be constant.

The operation of this high voltage generator is described below.

The deflecting circuit 15 forms a deflecting current by means of horizontal transistor 2, deflecting yoke 5, damper diode 3, and deflecting transformer (HOT) 8.

The blanking pulse voltage occurring in the blanking period is generated from the winding 6 or winding 9 magnetically coupled to the deflecting transformer 8 or deflecting yoke 5.

The generated voltage of the winding 6 or winding 9 is fed into a converter circuit composed of inductor 21, diodes 23, 24, resistance 22, and capacitor 25.

The output of the converter circuit is a dummy triangular wave output including the resonance as shown in FIG. 6.

In the rising positive portion of the blanking pulse, the diode 23 conducts, and the capacitor 25 is charged through the resistance 22. When the blanking pulse reaches the peak and begins to decline, the capacitor 25 begins to discharge through the inductor 21. When the blanking pulse becomes negative, the diode 24 conducts. At this moment, the wave is sliced by the voltage in the normal direction.

By setting longer the resonance frequency of the inductor 21 and capacitor 25, a wider pulse than the blanking pulse is obtained. Moreover, when the operation frequency is lower, a dummy triangular wave of a broader pulse width is obtained.

Therefore, in the constitution of embodiment 3,
the longer ON time than the pulse width is obtained,
the control range is wider in particular at low operation frequency, and
there is no drop of maximum output power at horizontal deflecting operation frequency and high voltage in particular at low frequency.
Also in the constitution of embodiment 3,
the blanking pulse width is broader as compared with the horizontal deflecting period,
it is free from non-saturation state in which switching is not secure, and
increase of loss is small.

In this circuit constitution, the electric power handled by the corrective transformer is small, and the generation of oscillating current and voltage is similar to the situation shown in FIG. 8.

According to the invention,
by adding a simple dummy triangular wave conversion circuit, the blanking pulse signal from the deflecting circuit can be converted into a dummy triangular wave,
the high voltage generating circuit synchronized with the horizontal deflecting operation frequency is constituted by a simple switching circuit and a control circuit, and
it is applicable to a wide range of operation frequency.

In particular, the advantage of capable of setting the maximum ON time easily depending on each operation frequency acts effectively for safety of operation of the switching circuit.

Moreover, by suppression of oscillating voltage and current, the high voltage generator of high efficiency and low noise level can be composed economically at low cost.

The invention is applicable to both deflecting and high voltage separated and integrated circuits, and its scope of applications is broad.

Moreover, the constitution of the embodiment suppresses the oscillation components, and therefore decreases
loss and heat generation of circuit elements by oscillating current, and
loss of transformer.

What is claimed is:

1. A high voltage generator having a high voltage transformer including a primary winding and a high voltage generating winding, and a switching element, comprising:

(a) synchronizing switching means responsive to a horizontal operation frequency, for generating a synchronization signal;

(b) high voltage stabilizing means, including a conversion circuit and responsive to the synchronization signal for converting a blanking pulse voltage into a specified switching actuation time by the horizontal operation frequency, and (c) a circuit for changing a DC bias voltage of a comparison output obtained from said conversion circuit, and controlling the actuation time of the switching element.

2. The high voltage generator of claim 1, wherein said conversion circuit is characterized by:

(a) connecting the anode of a first diode to the positive polarity side of the blanking pulse issued from the winding magnetically coupled to a deflecting transformer or deflecting yoke of a deflecting circuit, and a resistance to the cathode, (b) connecting an inductor parallel to a series circuit composed of said first diode and resistance, (c) connecting the cathode side of a parallel circuit composed of a second diode and a capacitor to the negative polarity side of said winding, and (d) connecting the anode side of said second diode to other end of the circuit composed of said resistance, first diode and inductor.

3. The high voltage generator of claim 2, wherein said conversion circuit is a circuit being set so as to obtain a dummy triangular wave so that the product of the square of the pulse width and the operation frequency may be constant, and by using it as comparative wave, a specified actuation time is issued depending on the operation frequency.

4. The high voltage generator of claim 1, wherein a high voltage detecting circuit and an error amplifier are provided as high voltage stabilizing means, and the DC bias voltage of the comparison output waveform is controlled.

5. The high voltage generator of claim 1, wherein as suppressing means of oscillating voltage generated in the period in which said switching element does not conduct, (a) a power source winding is provided at one leg of a U-shaped core, a power source is connected to one end of said power source winding, the anode of a diode is connected to other end of said power source winding, the cathode of said diode is connected to the drain of a switching element, the cathode of a damper diode is connected to other end of said power source winding, the anode of said damper diode is grounded, and the anode of a rectifying diode is connected to other end of said power source winding, (b) the cathode of said rectifying diode is connected to the negative polarity end of a primary winding wound around other leg of the U-shaped core, the negative polarity end of said primary winding is grounded through a smoothing capacitor, and the positive polarity end of said primary winding is connected to the drain of the switching element, and (c) the source of said switching element is grounded.

6. The high voltage generator of claim 5, wherein (a) a gate drive voltage is applied to the gate of said switching element, (b) the switching operation of said power source winding side is operated in a substantially continuous mode, and (c) the switching operation of said primary winding side is operated in a discontinuous mode.

7. The high voltage generator of claim 1, wherein as suppressing means of oscillating voltage generated in the period in which said switching element is not conducting, (a) a power source winding completely separated from a primary winding in magnetic coupling is provided, a power source is connected to one end of said power source winding, the anode of a diode is connected to other end of said power source winding, the cathode is connected to the drain of a switching element, the cathode of a damper diode is connected to other end of said power source winding, the anode is grounded, and the anode of a rectifying diode is connected to other end of said power source winding, (b) the cathode of said rectifying diode is connected to the negative polarity end of a primary winding wound around the core of the high voltage generating side, and is grounded through a smoothing capacitor, and (c) the positive polarity end of said primary winding is connected to the drain of said switching element, and the source of the switching element is grounded.

8. The high voltage generator of claim 7, wherein (a) a gate drive voltage is applied to the gate of said switching element, (b) the switching operation of said power source winding side is operated substantially in a continuous mode, and (c) the switching operation of said primary winding side is operated in a discontinuous mode.

9. The high voltage generator of claim 1, wherein as suppressing means of oscillating voltage generated in the period in which said switching element is not conducting, (a) a regenerative winding is provided, (b) the negative polarity end is grounded, and (c) the anode of a regenerative diode is connected to the positive polarity end, and the regenerative cathode is connected to the positive polarity end of the power source or smoothing capacity, thereby realizing an energy regenerative operation.

10. The high voltage generator of claim 9, wherein (a) the cathode of a second regenerative diode is connected to the negative polarity end of said regenerative winding, (b) the anode of said regenerative diode is grounded, (c) a capacitor is connected to both ends of the second regenerative diode, and (d) a capacitor is connected between the cathode of the second regenerative diode and the drain of the switching element.

11. The high voltage generator of claim 1, wherein the oscillating current is suppressed during the conduction period of said switching element, (a) the cathode of a first high voltage rectifying diode and the anode of a second high voltage rectifying diode are connected to a primary winding, and the winding start of a first layer of a high voltage winding having a laminate winding in the normal direction wound coaxially in plural layers, (b) the anode of the first high voltage rectifying diode is grounded, (c) the cathode of the second high voltage rectifying diode is connected to the winding end of the second layer, (d) the anode of a third high voltage rectifying diode is connected to the winding end of the second layer, and the cathode is connected to the winding start of a third layer, (e) the subsequent winding layers and the high voltage rectifying diodes are connected in series, and (f) the anode of the final high voltage rectifying diode is connected to the winding end of the final winding layer, and the cathode is connected to the high voltage smoothing capacitor, thereby obtaining a high voltage output.

12. The high voltage generator of claim 1, wherein the oscillating current is suppressed during the conduction period of said switching element, (a) one end of a capacitor is connected to a primary winding and the winding start of a first layer of a high voltage winding having a laminate winding in the normal direction wound coaxially in plural layers, and the cathode of a first high voltage rectifying diode and the anode of a second high voltage rectifying diode are connected to other end, (b) the anode of the first high voltage rectifying diode is grounded, (c) the cathode of the second high voltage rectifying diode is connected to the winding end of the first layer, (d) the anode of the second high voltage rectifying diode is connected to the winding end of the first layer, and the cathode is connected to the winding start of the second layer, (e) the subsequent winding layers and the high voltage rectifying diodes are connected in series, and (f) the anode of the final high voltage rectifying diode is connected to the winding end of the final winding layer, and the cathode is connected to the high voltage smoothing capacitor, thereby obtaining a high voltage output.

* * * * *